(12) United States Patent
Bowman et al.

(10) Patent No.: US 9,200,107 B2
(45) Date of Patent: Dec. 1, 2015

(54) COATING COMPOSITIONS AND METHODS FOR USING THE SAME AS A SPOT BLENDER

(75) Inventors: Mark P. Bowman, New Kensington, PA (US); Davina J. Schwartzmiller, Allison Park, PA (US); Stephen J. Thomas, Aspinwall, PA (US)

(73) Assignee: PPG Industries Ohio, Inc., Cleveland, OH (US)

( * ) Notice: Subject to any disclaimer, the term of this patent is extended or adjusted under 35 U.S.C. 154(b) by 1644 days.

(21) Appl. No.: 12/605,664

(22) Filed: Oct. 26, 2009

(65) Prior Publication Data

US 2011/0097481 A1    Apr. 28, 2011

(51) Int. Cl.
| C08G 18/62 | (2006.01) |
| C08G 18/81 | (2006.01) |
| B05D 5/00 | (2006.01) |
| B05D 7/14 | (2006.01) |
| C09D 175/16 | (2006.01) |
| B05D 7/00 | (2006.01) |

(52) U.S. Cl.
CPC ............. C08G 18/6254 (2013.01); B05D 5/005 (2013.01); B05D 7/53 (2013.01); C08G 18/8175 (2013.01); C09D 175/16 (2013.01); B05D 7/14 (2013.01); B05D 7/57 (2013.01)

(58) Field of Classification Search
CPC ........... C08G 18/6254; C08G 18/8175; B05D 5/005; B05D 7/53; B05D 7/14; B05D 7/57; C09D 175/16; C08F 2/50
USPC ............... 427/140, 385.5, 299, 290; 522/182, 522/174, 183
See application file for complete search history.

(56) References Cited

U.S. PATENT DOCUMENTS

| 6,332,291 | B1 * | 12/2001 | Flosbach et al. | 522/91 |
| 7,138,451 | B2 | 11/2006 | Witte et al. | |
| 2004/0053159 | A1 | 3/2004 | Wilke et al. | |
| 2005/0142297 | A1 | 6/2005 | Sugiura et al. | |
| 2006/0165882 | A1 * | 7/2006 | Stropp et al. | 427/140 |
| 2007/0048441 | A1 * | 3/2007 | Braun et al. | 427/140 |
| 2008/0090935 | A1 * | 4/2008 | Lettmann et al. | 522/173 |

FOREIGN PATENT DOCUMENTS

| CA | 2584965 A1 | 9/2006 |
| GB | 1281898 | 7/1972 |
| WO | WO0220680 A1 | 3/2002 |

* cited by examiner

Primary Examiner — Mark Eashoo
Assistant Examiner — Jessica Roswell
(74) Attorney, Agent, or Firm — William J. Uhl

(57) ABSTRACT

A composition that includes a polymeric polyol, a (meth) acrylate, a photoinitiator and solvent is disclosed.

20 Claims, No Drawings

US 9,200,107 B2

COATING COMPOSITIONS AND METHODS FOR USING THE SAME AS A SPOT BLENDER

FIELD OF THE INVENTION

The invention relates to coating compositions. In particular, the invention is directed to solvent based compositions comprising a polymeric polyol, a (meth)acrylate and less than 0.1% by weight photoinitiator, and methods for using such in repair coating systems for automotive refinish applications.

BACKGROUND INFORMATION

In the area of automotive repair where minor damage needs attention, it is often desirable to keep the area of repair small rather than repainting an entire panel. The minor damage is preferably remedied with the aid of techniques for very small-scale automotive refinish, also referred to as spot repair.

Spot repair entails for example cleaning and sanding of a damage site, optionally filling the damage site with filler composition, followed by drying or curing the filler, optionally sanding and cleaning, applying basecoat and clearcoat compositions, followed by application of a spot blender composition and curing the applied compositions. Improved spot blender compositions for use in such are desired.

SUMMARY OF THE INVENTION

The invention is directed to a composition comprising:
a polymeric polyol;
a (meth)acrylate;
less than 0.1% by weight of a photoinitiator; and
solvent.

The invention is further directed to a coating system comprising:
a clearcoat, wherein the clearcoat comprises a polymer having (meth)acrylate unsaturation, a polyisocyanate, and optionally a polythiol; and
a spot blender, wherein the spot blender comprises a polymeric polyol, a (meth)acrylate, less than 0.1% by weight of a photoinitiator, and solvent.

The invention is also directed to a method of repairing a damaged spot on an automotive substrate comprising:
(i) applying a clearcoat on the damaged spot;
(ii) applying a spot blender comprising a polymeric polyol, a (meth)acrylate, less than 0.1% by weight of a photoinitiator, and solvent over the clearcoat; and
(iii) curing the applied clearcoat and spot blender.

A composition comprising:
a polymeric polyol;
a urethane (meth)acrylate;
less than 0.1% by weight of a photoinitiator; and
solvent, wherein the urethane (meth)acrylate comprises a functional group comprising hydroxyl, isocyanate, acrylate or a combination thereof.

DETAILED DESCRIPTION

The invention is generally directed to compositions that include a polymeric polyol, a (meth)acrylate, a photoinitiator, and solvent.

Suitable polymeric polyols include (meth)acrylic polyols, polyester polyols, polyurethane polyols, polyether polyols, and mixtures thereof. The polymeric polyols may have a hydroxyl equivalent weight ranging from 100 to 1000 grams per equivalent, such as 150 to 500 grams per equivalent. The polymeric polyols may also have a glass transition temperature of less than 60° C., such as less than 40° C., such as less than 22° C. In certain embodiments, the compositions of the invention have a range of 2 to 10% by weight, such as 4 to 8% by weight of a polymeric polyol.

In embodiments, polymeric polyols may include carboxyl groups that can be prepared from polymerizable ethylenically unsaturated monomers, such as copolymers of (meth)acrylic acid and hydroxylalkyl esters of (meth)acrylic acid with one or more other polymerizable ethylenically unsaturated monomers such as alkyl esters of (meth)acrylic acid including methyl (meth)acrylate, ethyl (meth)acrylate, butyl (meth) acrylate, and 2-ethyl hexylacrylate, and vinyl aromatic compounds, such as styrene, alpha-methyl styrene and vinyl toluene.

Other embodiments include polymeric polyols with epoxy functional groups that are prepared from polymerizable ethylenically unsaturated monomers by copolymerizing oxirane group-containing monomers, for example glycidyl (meth) acrylate and allyl glycidyl ether, with other polymerizable ethylenically unsaturated monomers, such as those discussed above. Preparation of such epoxy functional acrylic polymers is described in detail in U.S. Pat. No. 4,001,156 at column 3 to 6, incorporated herein by reference.

Yet another embodiment includes polymeric polyols with carbamate functional groups that are prepared from polymerizable ethylenically unsaturated monomers by copolymerizing, for example, the above-described ethylenically unsaturated monomers with a carbamate functional vinyl monomer such as a carbamate functional alkyl ester of methacrylic acid. Useful carbamate functional alkyl esters can be prepared by reacting, for example, a hydroxyalkyl carbamate, such as the reaction product of ammonia and ethylene carbonate or propylene carbonate, with methacrylic anhydride. Other useful carbamate functional vinyl monomers include, for instance, the reaction product of hydroxyethyl methacrylate, isophorone diisocyanate, and methanol. Still other carbamate functional vinyl monomers may be used, such as the reaction product of isocyanic acid (HNCO) with a hydroxyethyl acrylate, and those described in U.S. Pat. No. 3,479,328, at column 1, line 24 to column 2, line 31, incorporated herein by reference. Carbamate functional groups can also be incorporated into the polymeric polyol by reacting the polymeric polyol with a low molecular weight alkyl carbamate such as methyl carbamate. Also, polymeric polyols can be reacted with isocyanic acid to provide pendent carbamate groups. Likewise, polymeric polyols can be reacted with urea to provide pendent carbamate groups therefrom.

Polymeric polyols prepared from polymerizable ethylenically unsaturated monomers can be prepared by solution polymerization techniques, which are well known to those skilled in the art, in the presence of suitable catalysts such as organic peroxides or azo compounds, for example, benzoyl peroxide or N,N-azobis(isobutyronitrile). The polymerization can be carried out in an organic solution in which the monomers are soluble by techniques conventional in the art. Alternatively, these polymeric polyols may be prepared by aqueous emulsion or dispersion polymerization techniques which are well known in the art. The ratio of reactants and reaction conditions are selected to result in acrylic polymers with the desired pendent functionality.

In other embodiments, polymeric polyols may be polyester polyols. Examples of polyester polyols include for example, the condensation products of polyhydric alcohols and polycarboxylic acids. Suitable polyhydric alcohols include ethylene glycol, neopentyl glycol, trimethylolpropane, and pentaerythritol. Suitable polycarboxylic acids include adipic acid, 1,4-cyclohexyl dicarboxylic acid, and hexahydrophthalic acid. In addition to the polycarboxylic acids mentioned above, functional equivalents of the acids such as anhydrides where they exist or lower alkyl esters of the acids such as the methyl esters can be used. Also, small amounts of monocarboxylic acids such as stearic acid can be used. The ratio of reactants and reaction conditions can be selected to result in a polyester polymer with the desired pendent functionality, for example, hydroxyl functionality.

For example, hydroxyl group-containing polyesters can be prepared by reacting an anhydride of a dicarboxylic acid such as hexahydrophthalic anhydride with a diol such as neopentyl glycol in a 1:2 molar ratio. Where it is desired to enhance air-drying, suitable drying oil fatty acids may also be added, and include those derived from linseed oil, soya bean oil, tall oil, dehydrated castor oil, or tung oil.

In other embodiments, polymeric polyols may be polyurethane polyols. For example, polyurethane polymers may be formed by reacting a polyester polyol with a polyisocyanate to form a polyurethane polymer having hydroxyl functionality. Examples of suitable polyisocyanates are aromatic isocyanates, such as 4,4'-diphenylmethane diisocyanate, 1,3-phenylene diisocyanate, and toluene diisocyanate, and aliphatic polyisocyanates, such as 1,4-tetramethylene diisocyanate and 1,6-hexamethylene diisocyanate. Cycloaliphatic diisocyanate, such as 1,4-cyclohexyl diisocyanate and isophorone diisocyanate, also can be employed.

In other embodiments, polymeric polyols may be polyether polyols. Examples of suitable polyether polyols include polyalkylene ether polyols such as those having the following structural formula:

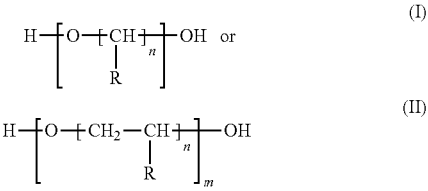

where the substituent R is hydrogen or a lower alkyl group containing from 1 to 5 carbon atoms, and n has a value ranging from 2 to 6 and m has a value ranging from 8 to 100 or higher. Exemplary polyalkylene ether polyols include poly (oxytetramethylene)glycols, poly(oxytetraethylene)glycols, poly(oxy-1,2-propylene) glycols, and poly(oxy-1,2-butylene)glycols.

Also useful are polyether polyols formed from oxyalkylation of various polyols, for example, glycols such as ethylene glycol, 1,6-hexanediol, Bisphenol A and the like, or other higher polyols such as trimethylolpropane, pentaerythritol, and the like. Polyols of higher functionality which can be utilized as indicated can be made, for instance, by oxyalkylation of compounds such as sucrose or sorbitol. One commonly utilized oxyalkylation method is reaction of a polyol with an alkylene oxide, for example, propylene or ethylene oxide, in the presence of an acidic or basic catalyst. Specific examples of polyethers include those sold under the names TERATHANE and TERACOL, available from E. I. Du Pont de Nemours and Company, Inc.

The compositions of the invention also include a (meth) acrylate and can have a range of 1 to 5% by weight, such as 2 to 4% by weight of (meth)acrylate. In an embodiment, the meth(acrylate) is a urethane (meth)acrylate or interchangeably referred herein to as a urethane containing (meth)acrylate. Alternatively, the (meth)acrylate may be a polyester-based (meth)acrylate and the like. The (meth)acrylate can have hydroxyl functional groups, isocyanate functional groups acrylate functional groups, or a combination thereof.

As stated above, in certain embodiments, the (meth)acrylates, can be isocyanate-functional (meth)acrylates. Any method for preparing isocyanate-functional (meth)acrylates as appreciated by one skilled in the art may be used. For example, an isocyanate-functional (meth)acrylate can be prepared by reacting a polyisocyanate with a hydroxyl alkyl (meth)acrylate.

Examples of polyisocyanate compounds include but are not limited to ethylene diisocyanate, 1,2-diisocyanatopropane, 1,3-diisocyanatopropane, 1,6-diisocyanatohexane, trimethylhexamethylene diisocyanate, 1,2-diisocyanatocyclohexane, 1,3-diisocyanatocyclohexane, 1,4-diisocyanatocyclohexane, 1,2-diisocyanatododecane, o-diisocyanatobenzene, m-diisocyanatobenzene, p-diisocyanatobenzene, bis(4-isocyanatocyclohexyl)methane, bis(4-isocyanatophenyl)methane, toluene diisocyanate (which commercially is a mixture comprising about 80 percent 2,4-diisocyanatotoluene and about 20 percent 2,6-diisocyanatotoluene), 3,3'-dichloro-4,4'-diisocyanatobiphenyl, tris(4-isocyanatophenyl)methane, 1,5-diisocyanatonaphthalene, hydrogenated toluene diisocyanate, 1-isocyanatomethyl-5-isocyanato-1,3,3-trimethylcyclohexane, and 1,3,5-tris(6-isocyanatohexyl)-biuret. Also included is a polyisocyanate in a blocked form such as a phenyl-blocked toluene diisocyanate and a phenol-blocked diisocyanatonaphthalene.

Examples of hydroxyl alkyl (meth)acrylates include but are not limited to 2-hydroxylethyl (meth)acrylate, hydroxyl propyl (meth)acrylate, and 4-hydroxylbutyl acrylate.

Yet in other embodiments, the (meth)acrylates can be hydroxyl-functional (meth)acrylates. For example, hydroxyl-functional (meth)acrylates can be prepared by reacting acrylic polyols with isocyanate-functional urethane acrylates. Any other methods for preparing hydroxyl-functional (meth)acrylates as appreciated by one skilled in the art can also be used.

In other embodiments, the (meth)acrylates can be acrylate-functional (meth)acrylates. For example, acrylate-functional (meth)acrylates can be prepared by reacting acrylic polyols with isocyanate-functional urethane (meth)acrylates. Other examples include reacting isocyanates with for example, diols. Any other methods for preparing acrylate-functional (meth)acrylates as appreciated by one skilled in the art may be utilized.

In an embodiment, the meth(acrylate) may be a urethane containing (meth)acrylate, having hydroxyl functional groups, isocyanate functional groups, acrylate functional groups or a combination thereof. In an embodiment, a urethane containing (meth)acrylate having for example, isocyanate and acrylate functionality may be prepared by reacting an diisocyanate and a hydroxyl butyl or hydroxyl ethyl acrylate. In other embodiments, a (meth)acrylate having acrylate and hydroxyl functionality may be prepared by reacting a polymeric polyol with an isocyanate-functional (meth)acrylate. Any other methods for preparing such may be utilized as appreciated by one skilled in the art.

The compositions of the invention also include less than 0.1% by weight of a photoinitiator. In certain embodiments, compositions include 0.07% by weight or less, such as 0.01 to 0.07% by weight, of the photoinitiator. The photoinitiator used in the compositions may be, for example, acyl phosphine oxides, for example IRGACURE 819, available from Ciba Specialty Chemicals or LUCIRIN TPO or LUCIRIN TPO-L available from BASF Corp., benziketals such as IRGACURE 651 from Ciba Specialty Chemicals, alpha-hydroxy ketones such as IRGACURE 184 or DAROCUR 1173 available from Ciba Specialty Chemicals or mixtures thereof. Other suitable photoinitiators include IRGACURE 1800 and IRGACURE 500 from Ciba Geigy, GENOCURE MBF from Rahn.

As will be appreciated by one skilled in the art, the present compositions include low amounts of the photoinitiator. Large amounts of the photoinitiator (such as greater than 0.1% by weight) in compositions comprising the same components result in poor external durability in cured coatings. It is believed that excess amounts of the photoinitiator attack the coating although the inventors do not wish to be bound by this mechanism. However, some amounts of the photoinitiator are advantageous as it aids the curing process. Accordingly, the inventors have discovered an amount of less than 0.1%, such as 0.07% by weight or less, such as 0.01 to 0.07% by weight, of the photoinitiator in the compositions results in improved exterior durability while allowing sufficient cure of the compositions to occur.

The compositions of the invention further include a solvent. Any suitable solvents can be used. Examples include but are not limited to aliphatic or aromatic hydrocarbon such as SOLVESSO 100 solvent or OXSOL 100 solvent, toluene or xylene, an alcohol such as n-butanol, sec-butanol, or isopropanol, an ester such as methyl acetate, n-propyl acetate, isobutyl acetate, n-butyl acetate, ethyl acetate, ethyl propionate, n-butyl propionate, or n-pentyl propionate, a ketone such as acetone, methyl isobutyl ketone, methyl ethyl ketone, methyl amyl ketone, methyl isoamyl ketone, or methyl n-propyl ketone, an ether, an ether-alcohol or an ether-ester such as ethyl 3-ethoxypropionate, propylene glycol methyl ether, propylene glycol ethyl ether, propylene glycol n-propyl ether or propylene glycol t-butyl ether, propylene glycol methyl ether acetate or a mixture of any of these. Compositions of the invention includes 90 to 97% by weight of the solvent. The amount and type of solvent used will depend on the desired viscosity and the intended application of the composition and is within the skill of one practicing in the art to determine.

The compositions described herein may further include one or more additional additives known in the art of formulating coatings such as plasticizers, anti-oxidants, hindered amine light stabilizers, UV light absorbers and stabilizers, surfactants, flow control agents, thixotropic agents, fillers, organic cosolvents, abrasion resistant particles, reactive diluents, catalysts, grind vehicles, and other customary auxiliaries.

The compositions may further comprise colorants. As used herein, the term "colorant" means any substance that imparts color and/or other opacity and/or other visual effect to the composition. The colorant can be added to the coating in any suitable form, such as discrete particles, dispersions, solutions and/or flakes (e.g., aluminum flakes). A single colorant or a mixture of two or more colorants can be used in the compositions described herein. In general, the colorant can be present in any amount sufficient to impart the desired visual and/or color effect.

Example colorants include pigments, dyes and tints, such as those used in the paint industry and/or listed in the Dry Color Manufacturers Association (DCMA), as well as special effect compositions. A colorant may include, for example, a finely divided solid powder that is insoluble but wettable under the conditions of use. A colorant can be organic or inorganic and can be agglomerated or non-agglomerated. Colorants can be incorporated into the coatings by use of a grind vehicle, such as an acrylic grind vehicle, the use of which will be familiar to one skilled in the art.

Example pigments and/or pigment compositions include, but are not limited to, carbazole dioxazine crude pigment, azo, monoazo, disazo, naphthol AS, salt type (lakes), benzimidazolone, condensation, metal complex, isoindolinone, isoindoline and polycyclic phthalocyanine, quinacridone, perylene, perinone, diketopyrrolo pyrrole, thioindigo, anthraquinone, indanthrone, anthrapyrimidine, flavanthrone, pyranthrone, anthanthrone, dioxazine, triarylcarbonium, quinophthalone pigments, diketo pyrrolo pyrrole red ("DPPBO red"), titanium dioxide, carbon black, or mixtures thereof. The terms "pigment" and "colored filler" can be used interchangeably.

Example dyes include, but are not limited to, those that are solvent and/or aqueous based such as phthalo green or blue, iron oxide, bismuth vanadate, anthraquinone, perylene, aluminum and quinacridone.

Example tints include, but are not limited to, pigments dispersed in water-based or water miscible carriers such as AQUA-CHEM 896 commercially available from Degussa, Inc., CHARISMA COLORANTS and MAXITONER INDUSTRIAL COLORANTS commercially available from Accurate Dispersions division of Eastman Chemical, Inc.

As noted above, the colorant can be in the form of a dispersion including, but not limited to, a nanoparticle dispersion. Nanoparticle dispersions can include one or more highly dispersed nanoparticle colorants and/or colorant particles that produce a desired visible color and/or opacity and/or visual effect. Nanoparticle dispersions can include colorants such as pigments or dyes having a particle size of less than 150 nm, such as less than 70 nm, or less than 30 nm. Nanoparticles can be produced by milling stock organic or inorganic pigments with grinding media having a particle size of less than 0.5 mm. Example nanoparticle dispersions and methods for making them are identified in U.S. Pat. No. 6,875,800. Nanoparticle dispersions can also be produced by crystallization, precipitation, gas phase condensation, and chemical attrition (i.e., partial dissolution). In order to minimize re-agglomeration of nanoparticles within the coating, a dispersion of resin-coated nanoparticles can be used. As used herein, a "dispersion of resin-coated nanoparticles" refers to a continuous phase in which discreet "composite microparticles", which comprise a nanoparticle and a resin coating on the nanoparticle, is dispersed. Example dispersions of resin-coated nanoparticles and methods for making them are identified in United States Patent Application Publication 2005/0287348, U.S. Provisional Application No. 60/482,167, and U.S. patent application Ser. No. 11/337,062.

Example special effect compositions that may be used include pigments and/or compositions that produce one or more appearance effects such as reflectance, pearlescence, metallic sheen, phosphorescence, fluorescence, photochromism, photosensitivity, thermochromism, goniochromism and/or color-change. Additional special effect compositions can provide other perceptible properties, such as opacity or texture. In a non-limiting embodiment, special effect compositions can produce a color shift, such that the color of the coating changes when the coating is viewed at different angles. Example color effect compositions are identified in U.S. Pat. No. 6,894,086. Additional color effect compositions can include transparent coated mica and/or synthetic mica, coated silica, coated alumina, a transparent liquid crystal pigment, a liquid crystal coating, and/or any composition wherein interference results from a refractive index differential within the material and not because of the refractive index differential between the surface of the material and the air.

In certain non-limiting embodiments, a photosensitive composition and/or photochromic composition, which reversibly alters its color when exposed to one or more light sources, can be used in the compositions described herein. Photochromic and/or photosensitive compositions can be activated by exposure to radiation of a specified wavelength. When the composition becomes excited, the molecular structure is changed and the altered structure exhibits a new color that is different from the original color of the composition. When the exposure to radiation is removed, the photochromic and/or photosensitive composition can return to a state of rest, in which the original color of the composition returns. In one non-limiting embodiment, the photochromic and/or photosensitive composition can be colorless in a non-excited state and exhibit a color in an excited state. Full color-change can appear within milliseconds to several minutes, such as from 20 seconds to 60 seconds. Example photochromic and/or photosensitive compositions include photochromic dyes.

In a non-limiting embodiment, the photosensitive composition and/or photochromic composition can be associated with and/or at least partially bound to, such as by covalent bonding, a polymer and/or polymeric materials of a polymerizable component. In contrast to some coatings in which the photosensitive composition may migrate out of the coating and crystallize into the substrate, the photosensitive composition and/or photochromic composition associated with and/or at least partially bound to a polymer and/or polymerizable component in accordance with a non-limiting embodiment of the present invention, have minimal migration out of the coating. Example photosensitive compositions and/or photochromic compositions and methods for making them are identified in U.S. application Ser. No. 10/892,919.

Suitable catalysts that may be used include acid and basic catalyst known to those skilled in the art. Lewis acid and base catalysts, as well as organic acid and base catalysts, may be utilized in the present invention. For example, tin naphthenate, tin benzoate, tin octoate, tin butyrate, dibutyltin dilaurate, dibutyltin diacetate, dibutyltin oxide, lead octoate, aluminum ethyl acetoacetate, zirconium ethyl acetoacetate, and unblocked and blocked versions of dinonylnaphthalene disulfonic acid, dodecylbenzenesulfonic acid, p-toluenesulfonic acid, alkyl acid phosphate, phenyl acid phosphate, 1,4-diazabicyclo[2.2.2]octane (DABCO), triethylamine, guanine, pyridine, tetramethylguanidine, phosphonic and diphosphonic diesters, and the various blocked versions of the catalysts mentioned above.

In addition to the materials described above, the compositions can also comprise an organic solvent. Suitable organic solvents that can be used in the coating composition include any of those listed in the preceding paragraphs as well as butyl acetate, xylene, methyl ethyl ketone, or combinations thereof.

In certain embodiments, compositions described herein may include a urethane-forming catalyst. The compositions may include 0.01% by weight or less of a urethane-forming catalyst. Small amounts of the urethane-forming catalyst in the compositions aid in improving the external appearance of the composition for an improved "invisible" finish. In other embodiments, the urethane-forming catalyst may be present and participate in reactions with an additional coating, such as, as a urethane-type clearcoat. For example, the urethane-forming catalyst of the spot blender would also act as catalyst for a urethane reaction in urethane-type clearcoats.

The urethane-forming catalysts may be metal catalysts, for example tin, zinc, bismuth, and the like. Examples of urethane-forming catalysts include organotin compounds (e.g., dibutyltin dilaurate and dibutyltin diacetate), zinc carboxylates, bismuth carboxylates, organomercury compounds, tertiary amines, amine salts such as triethylamine salt of dibutyl phosphate, acids such as phenyl acid phosphate and acetic acid, metal chelates such as zirconium acetylacetonate and others that are known to those skilled in the art to catalyze the reaction of isocyanates with alcohols.

In certain embodiments, polymeric polyols and (meth) acrylates of the composition may be pre-reacted prior to the addition of the other materials of the composition. For example, the polymeric polyol and the (meth)acrylate may be pre-reacted to form a polymer having both (meth)acrylate unsaturation and hydroxyl groups. Such a polymer has a (meth)acrylate equivalent weight of 800 to 1200 and a hydroxyl equivalent weight of 500 to 1000. In this embodiment, once the reaction product is formed, the photoinitiator and any additional desired additives are added. In embodiments, an additional amount of polymeric polyol may also be added after the reaction product is formed. The solvent is added as the final component. In certain embodiments, a urethane-forming catalyst may be added after the photoinitiator or alternatively, may be added with the polymeric polyol and the (meth)acrylate to aid in the pre-reaction. Once the components are collected, they are then mixed to create a homogenous mixture of the composition, for example by a low shear mixing process or any process as appreciated by one skilled in the art.

The compositions described herein may also be made by adding the ingredients separately and sequentially to a vessel in the recited amounts herein. In an embodiment, the following components may be added to a vessel sequentially: first a polymeric polyol, then the (meth)acrylate, then a photoinitiator, then the optional urethane-forming catalyst and/or additives and the like, and finally the solvent. Once collected in the vessel, the mixture is stirred together to create a homogenous mixture as appreciated by one skilled in the art, for example by a low shear mixing process.

The compositions of the invention is particularly suitable for use as a spot blender composition that may be used in the refinishing of automobiles and trucks. For example, the spot blender may be used to repair damaged areas or spots up to 3 cm in diameter. In use, when the spot blender is applied to a damaged area, the spot blender may be cured by application of ultraviolet radiation with wavelengths of from 200 to 500 nm. The radiation may be supplied by lamps emitting the desired radiation wavelength. Filters may be used and distance of the lamp may be adjusted to effect the desired curing. The use of the spot blender in repair systems provides an "invisible" finish leaving no visual indications of repair at the damaged site.

The spot blender may also be used in clearcoat repair systems, including for example, multi-cure and/or multilayer coating repair systems. The spot blender may be used with any number of clearcoat compositions. In a particular suitable embodiment, the spot blender may be used in conjunction with a multi-component clearcoat composition. "Multi-component" means at least two components, for example, two-component ("2K") or a three-component ("3K") coating. In certain embodiments, the first component may be a polymer having both (meth)acrylate unsaturation and hydroxyl functionality, for example an acrylic copolymer. The second component may be a polyisocyanate curing agent. Optionally a third component comprising a polythiol may be used. Examples of clearcoat compositions are described in U.S. patent application Ser. No. 12/202,874 filed on Sep. 2, 2008, at paragraphs 6-38 and U.S. Patent Application Publication No. 2009/047546 filed on Aug. 17, 2007 at paragraphs [0011]-[0025], both of which are incorporated by reference herein.

While the spot blender is said to be used in a "multi-cure system/coating", i.e., systems that undergo cure through two or more different mechanisms, it is to be understood that the spot blender can be used with any system and/or coatings. For example, the spot blender can be used with coatings that cure by one mechanism or coatings that do not cross-link, for example air-dried lacquers.

The invention further relates to a method of repairing a small area, imperfection or damaged spot on an automotive substrate or coating. The method includes (i) applying a clearcoat on the damaged spot, (ii) applying a composition of the invention over the clearcoat and (iii) curing the applied clearcoat and spot blender. In embodiments, the applied clearcoat and spot blender may be cured simultaneously, for example with UV radiation. Alternatively, the clearcoat may be cured initially and then the spot blender may be applied over the clearcoat and subsequently cured. The clearcoat and/or spot blender may be cured by any of one of radiation curing, thermal curing, chemical curing, or a combination thereof.

The method may also include any one or more of the steps as described in U.S. Patent Application Publication No. 2007/0048441, at paragraphs 40-45, incorporated by reference herein. Any one or more of the following steps may occur prior to the step of applying the clearcoat to the damaged spot including but not limited to cleaning the damaged spot and/or its surroundings; sanding and/or re-cleaning the damaged spot; optionally, filling, sanding and/or cleaning the damaged spot, optionally at least one of applying at least one of a filler and/or primer and/or flashing off a resultant filler film, curing the filler film and/or sanding and/or cleaning the resultant filler coat; and/or applying a basecoat material to the filler film, flashing off a resultant basecoat film, and/or removing any overspray on the damaged spot.

As used herein, unless otherwise expressly specified, all numbers such as those expressing values, ranges, amounts or percentages may be read as if prefaced by the word "about", even if the term does not expressly appear. Also, any numerical ranges recited herein is intended to include all sub-ranges subsumed therein. Singular encompasses plural and vice versa. For example, although reference is made herein to "a" polymeric polyol, "an" isocyanate-functional (meth)acrylate, and "a" photoinitiator, one or more of each of these and any other components can be used. In addition, in this application, the use of "or" means "and/or" unless specifically stated otherwise, even though "and/or" may be explicitly used in certain instances. As used herein, the term "polymer" refers to oligomers and both homopolymers and copolymers, and the prefix "poly" refers to two or more. As used herein, the term "(meth)acrylic" refers to both acrylic and methacrylic. As used herein, the term "(meth)acrylate" refers to both acrylate and methacrylate. As used herein, the term "(cyclo)aliphatic" refers to both aliphatic and cycloaliphatic. Including and like terms means including but not limited to.

For purposes of the following detailed description, it is to be understood that the invention may assume various alternative variations and step sequences, except where expressly specified to the contrary.

EXAMPLES

The following examples are intended to illustrate the invention and should not be construed as limiting the invention in any way. All parts and percentages are by weight unless otherwise indicated.

Resin Example 1

Resin Example 1 describes the preparation of a polymeric polyol used in the composition of the invention, specifically an acrylic polyol.

An acrylic polyol was made from adding 21.8% methyl methacrylate, 21.8% styrene, 16% hydroxyethyl methacrylate, 9.6% acrylic acid, and 30.9% CARDURA E (010 epoxy from HEXION). The acrylic polyol resulted in 60% weight resin solids in aromatic 100 (35% weight) and butyl acetate (65% weight) solvent blends. The acrylic polyol had an acid value of 10 and a hydroxyl value of 78. The acrylic polyol also has a Tg of 34° C.

Resin Example 2

Resin Example 2 describes the preparation of a urethane containing (meth)acrylate having isocyanate and acrylate functionality used in the composition of the invention.

A urethane acrylate was prepared by stirring at room temperature a mixture of 515.3 grams 1,6-hexamethylene diisocyanate, DESMODUR N 3600 from Bayer Material Science, 0.28 grams of a free radical inhibitor (hydroquinone monomethyl ether), 0.25 grams of dibutyltin dilaurate and 172.0 grams of butyl acetate under nitrogen. Then 414.6 grams of 4-hydroxyl butyl acrylate was added dropwise over the course of 60 minutes. 59.2 grams of butyl acetate was added and the mixture was then maintained at 60-65° C. for 30 minutes.

Resin Example 3

Resin Example 3 describes the preparation of a urethane containing (meth)acrylate, having isocyanate and acrylate functionality used in the composition of the invention.

A urethane acrylate was prepared by stirring at room temperature a mixture of 2707.1 grams of isophorone diisocyanate, DESMODUR Z4470 SN from Bayer Material Science, 4.065 grams of a free radical inhibitor, IONOL, 2.38 grams of dibutyltin dilaurate, and 7.00 grams of triphenyl phosphate under nitrogen. Then 445.6 grams of 2-hydroxyethyl acrylate was added drop wise over the course of 20 minutes while maintaining the reaction temperature at 75° C. Then, 20.5 grams 1,4 butanediol was added all at once. The reaction mixture was stirred for an additional 60 minutes at 75° C. Finally, 342.0 grams of butyl acetate was added and stirred for minutes.

Resin Example 4

Resin Example 4 describes the preparation of a polymeric polyol, specifically an acrylic polyol.

A reaction vessel equipped with a stirrer, thermocouple, condenser and addition funnels equipped with pumps was charged with 509.3 grams of ethoxypropyl acetate and heated to reflux, about 157° C. Two feeds, identified herein as A and B, were next gradually added to the vessel over a period of four hours while the contents of the vessel were maintained at reflux conditions. Feed A consisted of a mixture of 625.8 grams 2-ethylhexyl acrylate, 962.8 grams hydroxyethyl methacrylate, 2816 grams isobornyl methacrylate, 36.1 grams acrylic acid, 500.7 g n-butyl methacrylate, 12.0 grams t-dodecyl mercapan and 32.5 grams ethoxypropyl acetate. Feed B was a mixture of 105.6 grams LUPEROX DTA (from Arkema) and 109.3 grams ethoxypropyl acetate. After the addition of feed A and B was complete, the addition funnel was rinsed with 32.5 grams ethoxypropyl acetate. Then, a feed of a mixture of 14.8 grams LUPEROX DTA and 15.3 grams ethoxypropyl acetate was added over 30 minutes. The funnel was rinsed with 32.5 grams ethoxypropyl acetate and the contents of the vessel were allowed to reflux for 1 hour. Thereafter, heating was discontinued and the contents of the vessel were allowed to cool.

The resultant product was a film-forming polymer having a total solids content measured for 1 hour at 110° C. of 73.6 percent by weight, a peak molecular weight of 2750, a weight average molecular weight of 2912 and a number average molecular weight of 1439 as determined by gel permeation chromatography utilizing a polystyrene standard, a Gardner-Holt viscosity of Z, an acid value of 8.63 and a hydroxyl value of 128.3.

Resin Example 5

Resin Example 5 demonstrates an embodiment where the polymeric polyol was pre-reacted with the isocyanate functional (meth)acrylate to form a polymer with acrylate functionality and hydroxyl groups.

A reaction flask was equipped with a stirrer, thermocouple, nitrogen inlet, and a condenser. 347.2 grams of acrylic polyol synthesized in Resin Example 4 was then added, stirred and heated to 65° C. with a mild flow of air passing through the flask. 235.4 grams of isocyanate-functional (meth)acrylate synthesized in Resin Example 2 was added to the flask using an addition funnel over an hour. The funnel was rinsed with 59.4 grams of n-butyl acetate and the rinse was added into the reaction mixture. The reaction mixture was stirred for 195 minutes at 65° C. and by which time there was no isocyanate detected by IR. The polymer solution was cooled to ambient temperature. The resultant product had a total solids content measured for 1 hour at 110° C. of 70.2%, a number average molecular weight of 2476, a weight average molecular weight of 24615, a peak molecular weight of 114154, and a polydispersity of 9.9.

Resin Example 6

Resin Example 6 describes the preparation of a polymeric polyol, specifically a polyester.

A reaction vessel equipped with a stirrer, thermocouple, glycol recovery set-up, condenser and Dean-Stark trap was charged with 950.0 grams of 1,3-propanediol (Shell Chemical), 162.4 grams methyl isobutyl ketone, 2.17 grams IONOL, 4.33 grams butyl stannoic acid and 10.84 grams triisodecyl phosphite and heated to about 100° C. Then, 1083.3 grams itaconic acid (CARGILL) was added to the reaction vessel and the contents heated to reflux, about 133° C. Water was removed from the reaction while the reaction temperature was gradually increased to 170° C. When the acid value of the reaction reached 6.65 mg KOH/g, heating was discontinued and the contents of the vessel were allowed to cool.

The resultant product had a total solids content measured for 1 hour at 110° C. of 89.3 percent by weight, a peak molecular weight of 808, a weight average molecular weight of 1711, a number average molecular weight of 618 as determined by gel permeation chromatography utilizing a polystyrene standard, a Gardner-Holt viscosity of V+, an APHA color of 70, a hydroxyl value of 258.9, and a water content of 0.04%.

Examples 1-3 illustrate spot blender compositions in accordance with the invention.

Example 1

|  | Formula Weight | Solid Resin |
|---|---|---|
| Polymeric Polyol (Resin Example 1) | 123.69 | 74.07 |
| Isocyanate-Functional (Meth)Acrylate (Resin Example 2) | 30.82 | 24.69 |
| DBTDL[1] | 0.05 | 0.05 |
| TPO INITIATOR[2] | 1 | 1 |
| BYK 258N[3] | 0.3 | 0.16 |
| BYK 306[4] | 0.3 | 0.04 |
| BUTYL ACETATE[5] | 64.75 |  |
| SOLVESSO 100[6] | 309.51 |  |
| XYLENE[7] | 410.53 |  |
| MIBK[8] | 642.18 |  |
| AMYL PROPIONATE[9] | 83.53 |  |
| Total | 1666.67 | 100 |

[1] Dibutyl Tin Dilaurate Dabco T-12 from Air Products & Chemicals Inc.
[2] GENOCURE TPO from RAHN.
[3] Acrylate Copolymer Flow Additive from BYK Chemie.
[4] Modified Polysiloxane Flow Additive from BYK Chemie.
[5] n-Butyl Acetate from EASTMAN CHEMICAL.
[6] Aromatic Hydrocarbon Solvent from EXXON.
[7] Aromatic Solvent from Shell Chemical Co.
[8] Methyl Isobutyl Ketone from EASTMAN CHEMICAL.
[9] n-Amyl Propionate from DOW CHEMICAL.

Example 2

Example 2 illustrates another spot blender of the invention where the polymeric polyol and the isocyanate-functional (meth)acrylate are pre-reacted. In addition to the polymer of the reacted product, the spot blender also includes an additional amount of a polymeric polyol. The additional polymeric polyol further aids in the blending of the spot blender with the damaged area to result in an "invisible" finish.

|  | Formula Weight | Solid Resin |
|---|---|---|
| Polymer (Resin Example #5) | 33.00 | 23.10 |
| Polymeric Polyol (Resin Example #1) | 125.00 | 74.85 |
| TPO INITIATOR | 1.00 |  |
| SOLVESSO 100 | 478.00 |  |
| XYLENE | 634.00 |  |
| MIBK | 1099.40 |  |
| AMYL PROPIONATE | 129.00 |  |
| BYK 258N | 0.30 |  |
| BYK 306 | 0.30 |  |
| Total | 2500.00 | 99.14 |

Example 3

Example 3 illustrates yet another spot blender of the invention. The composition of Example 3 is similar to that of Example 2, in that it includes a polymer produced by pre-reacting a polymeric polyol and an isocyanate-functional (meth)acrylate. The spot blender also includes an additional amount of a polymeric polyol.

|  | Formula Weight | Solid Resin |
| --- | --- | --- |
| Polymer (Resin Example #5) | 16.50 | 11.55 |
| Polymeric Polyol (Resin Example #1) | 125.00 | 74.85 |
| TPO INITIATOR | 1.00 | 1.00 |
| SOLVESSO 100 | 478.00 | |
| XYLENE | 634.00 | |
| MIBK | 1116.40 | |
| AMYL PROPIONATE | 129.00 | |
| BYK 300[10] | 0.10 | 0.05 |
| Total | 2500.00 | 87.45 |

[10]Silicone Flow Additive Solution from BYK Chemie.

Examples 4-6 illustrate exemplary clearcoat compositions that the spot blender of the invention may be used with for repair coating systems. In some of Example 4-6, the clearcoat compositions include the same materials (i.e. polymeric polyols or (meth)acrylates) as synthesized in Resin Examples 1-5 and used in the spot blender composition. These examples are not meant to be limiting, as the clearcoat and the spot blender may or may not use the same materials.

Example 4

Below is an example of a UV Clearcoat that may be used with the spot blender of the invention.

|  | Formula Weight | Solid Resin |
| --- | --- | --- |
| PACK 1 | | |
| (Meth)Acrylate (Resin Example 3) | 77.71 | 52.0 |
| SARTOMER SR 355[11] | 26.8 | 26.8 |
| TINUVIN 384-2[12] | 2.32 | 2.2 |
| SANOL LS-292[13] | 1.1 | 1.1 |
| BYK 300 | 0.5 | 0.25 |
| ESACURE ONE | 5 | 5.0 |
| IRGACURE 184[14] | 1 | 1.0 |
| AMYL PROPIONATE | 4.48 | |
| MIBK | 20 | |
| Subtotal | 138.9 | 88.34 |
| PACK 2 | | |
| THIOCURE PETMP[15] | 11.66 | 11.66 |
| AMYL PROPIONATE | 22.43 | |
| Subtotal | 34.09 | 11.66 |
| Total | 173 | 100.0 |

[11]Ditrimethylolpropane Tetraacrylate from Sartomer.
[12]Benzotriazole Derivative light stabilizer From CIBA SPECIALTY CHEMICALS.
[13]Pentamethyl-4-Piperidinyl Sebacate hindred amine light stabilizer from SANKYO CO.
[14]Hydroxycyclohexyl Phenyl Ketone From CIBA SPECIALTY CHEMICALS.
[15]Tetra(3-Mercaptopropionate)-Pentaerythritol From Bruno Brock Chemische Fabrik Gmbh.

Example 5

Below is another example of a UV clearcoat composition that may be used with the spot blender composition of the invention.

|  | Formula Weight | Resin Solids |
| --- | --- | --- |
| PACK 1 | | |
| BYK 300 | 0.5 | 0.25 |
| TINUVIN 384-2 | 2.32 | 2.2 |
| SANOL LS 292 | 1.1 | 1.1 |
| TPO Photoinitiator | 1.8 | 1.8 |
| IRGACURE 184 | 1.8 | 1.8 |
| BUTYL ACETATE | 30.00 | |
| MIBK | 20 | |
| DBTDL | 0.3 | 0.3 |
| Polymer (Resin Example 5) | 57.14 | 40.0 |
| Polymeric Polyol (Resin Example 6) | 27.65 | 25.0 |
| Sub Total | 142.6 | 72.45 |
| PACK 2 | | |
| Z4470 BA Isocyanate[16] | 21.4 | 15.0 |
| DESMODUR N 3600 Isocyanate[17] | 15.0 | 15.0 |
| Sub Total | 36.4 | 30.0 |
| PACK 3 | | |
| THIOCURE TMPMP[18] | 5.0 | 5.0 |
| Total | 179.0 | 107.45 |

[16]DESMODUR Z 4470 BA IPDI-Base Polyisocyanate From Bayer Materialscience LLC.
[17]DESMODUR N 3600 Aliphatic HDI-Based Polyisocyanate From Bayer Materialscience LLC.
[18]Trimethyl Tri(3-Mercaptopropionate) From Bruno Brock Chemische Fabrik Gmbh.

Example 6

Example 6 illustrates another UV clearcoat composition. In this example, the intermediate urethane acrylate was part of the isocyanate crosslinker package (Pack 2) instead of reacting with the acrylic polyol (Pack 1) to make a clearcoat composition. The spot blender composition of the invention can be used in conjunction with the clearcoat composition below.

|  | Formula Weight | Resin Solids |
| --- | --- | --- |
| PACK 1 | | |
| BYK 300 | 0.5 | 0.25 |
| TINUVIN 384-2 | 2.32 | 2.2 |
| SANOL LS 292 | 1.1 | 1.1 |
| TPO Photoinitiator | 1.8 | 1.8 |
| IRGACURE 184 | 1.8 | 1.8 |
| BUTYL ACETATE | 30.00 | |
| MIBK | 20 | |
| DBTDL | 0.3 | 0.3 |
| Polymeric Polyol (Resin Example 4) | 27.17 | 20.0 |
| Polymeric Polyol (Resin Example 6) | 27.65 | 25.0 |
| Subtotals | 112.6 | 52.45 |
| PACK 2 | | |
| Z4470 BA Isocyanate | 21.4 | 15.0 |
| (Meth)Acrylate (Resin Example 2) | 25.0 | 20.0 |
| DESMODUR N 3600 Isocyanate | 15.0 | 15.0 |
| Subtotals | 61.4 | 50.0 |
| PACK 3 | | |
| THIOCURE TMPMP | 5.0 | 5.0 |
| Total | 179.0 | 107.45 |

Example 7

Example 7 illustrates a process for repair. A curved metal panel size 12×12 inches coated with an OEM basecoat clearcoat system was used as the substrate to demonstrate a repair. A small area (6×4 inches) was sanded with 1200 grit paper. The UV clearcoat of Example 4 was applied to the sanded area with an HPLV gun (Devilbiss 1.2 mm tip), the spot blender of Example 1 was applied to the edge of the UV clearcoat and blended part way into the clearcoat, so as to form a uniform blend. The coated repair area was cured under an AutoShot UVA 400 Curing System lamp for 5 minutes. The distance of the lamp to substrate was 10 inches. After the substrate cooled to room temperature the repair area was buffed using an electric buffer with a foam pad and 3M 06002 FINESSE-IT Polish-Extra Fine. Any remaining residue was cleaned with spirit wipe (VM&P Naphtha from Shell Chemical). The final repair area on the substrate yielded a repair that showed no visible indication of a repair and resulted in a smooth high gloss edge free repair finish.

Whereas particular embodiments of this invention have been described above for purposes of illustration, it will be evident to those skilled in the art that numerous variations of the details of the present invention may be made without departing from the invention as defined in the appended claims.

What is claimed is:

1. A composition comprising:
   2 to 10% of a polymeric polyol;
   1 to 5% of a urethane (meth)acrylate containing both isocyanate groups and hydroxyl groups;
   less than 0.1% by weight of a photoinitiator; and
   90 to 97% of solvent; the percentages being by weight and based on total weight of the composition.

2. The composition of claim 1, wherein the composition comprises ≤0.07% by weight of the photoinitiator.

3. The composition of claim 1, wherein the polymeric polyol comprises a (meth)acrylic polyol.

4. A coating system, comprising:
   a clearcoat, wherein the clearcoat comprises a polymer having (meth)acrylate unsaturation, a polyisocyanate and optionally a polythiol; and
   a spot blender, wherein the spot blender comprises the composition of claim 1.

5. The coating system of claim 4, wherein the urethane (meth)acrylate of the spot blender has isocyanate functional groups.

6. The coating system of claim 5, wherein the urethane (meth)acrylate of the spot blender has hydroxyl groups.

7. The coating system of claim 4, wherein the polymeric polyol of the spot blender comprises a (meth)acrylic polyol.

8. The coating system of claim 4, wherein the coating system is radiation cured, thermally cured, or a combination thereof.

9. A method of repairing a damaged spot on an automotive substrate comprising:
   (i) applying a clearcoat on the damaged spot;
   (ii) applying a spot blender comprising a composition of claim 1 over the clearcoat; and
   (iii) curing the applied clearcoat and spot blender.

10. The method of claim 9, wherein the clearcoat comprises a polymer having (meth)acrylate unsaturation, a polyisocyanate, and optionally a polythiol.

11. The method of claim 9, wherein prior to the step of applying the clearcoat, one or more of the following steps is performed:
   (i) cleaning the damaged spot and/or its surroundings;
   (ii) sanding and/or recleaning the damaged spot;
   (iii) optionally, filling, sanding and/or cleaning the damaged spot;
   (iv) optionally at least one of applying at least one of a filler or primer and/or flashing off a resultant filler film, curing the filler film and/or sanding and cleaning the resultant filler coat; and
   (v) applying a basecoat material to the filler film, flashing off a resultant basecoat film, and removing any overspray on the damaged spot.

12. The method of claim 9, wherein the urethane (meth)acrylate of the spot blender has isocyanate functional groups.

13. The method of claim 9, wherein the spot blender comprises ≤0.07% by weight of the photoinitiator.

14. The method of claim 12, wherein the urethane (meth)acrylate of the spot blender has hydroxyl groups.

15. The method of claim 9, wherein the polymeric polyol of the spot blender comprises a (meth)acrylic polyol.

16. A composition comprising:
   (a) 2 to 10% of a polymeric polyol;
   (b) 1 to 5% of a urethane (meth)acrylate containing isocyanate groups;
   (c) less than 0.1% of a photoinitiator; and
   (d) 90 to 97% of solvent;
   the percentages being by weight based on total weight of the composition.

17. The composition of claim 16, wherein the polymeric polyol is a (meth)acrylic polyol.

18. The composition of claim 16, wherein the composition comprises ≤0.07% by weight of the photoinitiator.

19. A coating system, comprising:
   (a) a clearcoat, wherein the clearcoat comprises a polymer having (meth)acrylate unsaturation, a polyisocyanate, and optionally a polythiol; and
   (b) a spot blender, wherein the spot blender comprises the composition of claim 16.

20. A method of repairing a damaged spot on an automotive substrate comprising:
   (i) applying a clearcoat on the damaged spot;
   (ii) applying a spot blender comprising a composition of claim 16 over the clearcoat; and
   (iii) curing the applied clearcoat and spot blender.

* * * * *